US007706800B2

(12) United States Patent
Sharaga

(10) Patent No.: US 7,706,800 B2
(45) Date of Patent: Apr. 27, 2010

(54) SYSTEM, APPARATUS AND METHOD OF HAND OVER IN WIRELESS COMMUNICATION SYSTEM

(75) Inventor: Avishay Sharaga, Beit Nehemya (IL)

(73) Assignee: Intel Corporation, Santa Clara, CA (US)

( * ) Notice: Subject to any disclaimer, the term of this patent is extended or adjusted under 35 U.S.C. 154(b) by 1122 days.

(21) Appl. No.: 11/318,568

(22) Filed: Dec. 28, 2005

(65) Prior Publication Data
US 2007/0149200 A1 Jun. 28, 2007

(51) Int. Cl.
*H04W 36/00* (2009.01)

(52) U.S. Cl. .................. 455/439; 455/411; 455/436; 713/171

(58) Field of Classification Search .................. 455/439, 455/436, 411; 713/171
See application file for complete search history.

(56) References Cited

U.S. PATENT DOCUMENTS

2004/0103282 A1* 5/2004 Meier et al. .................. 713/171

\* cited by examiner

*Primary Examiner*—Patrick N Edouard
*Assistant Examiner*—Chuck Huynh
(74) *Attorney, Agent, or Firm*—Shiloh et al.

(57) ABSTRACT

Briefly, a wireless communication device, a wireless communication system and a method of roaming from a first base station to a second base station. The method includes generating first and second contexts, wherein the first context is used with an authentication key of the first base station and wherein the second context is stored at both the first and second base stations. When roaming to the second base station, the method includes using the second context with an authenticating key of the second base station and storing the first context at the first and second base stations.

18 Claims, 3 Drawing Sheets

SYSTEM, APPARATUS AND METHOD OF HAND OVER IN WIRELESS COMMUNICATION SYSTEM

BACKGROUND OF THE INVENTION

In wireless broadband systems, for example, a wireless metropolitan area network (WMAN) may be based on IEEE 802.16e, 2005 standard, also know in the art as WiMAX. The WMAN may include a plurality of base stations and plurality of mobile stations. A mobile station may perform a hand-over from one base station to another base station. The mobile station may roam from one wireless communication network to another wireless communication system. Roaming may be done from a first base station of a first wireless communication network to a second base station of a second wireless communication network. In WMAN, when the mobile station performs the hand over, some processes and/or security measures may operate on transmissions between the mobile station and the base stations. The hand over may be seamless to the mobile station. The security measures may include decryption/encryption and authentication of the transmissions.

During hand over from a source base station to a target base station, an authentication key (AK) for the target BS may be derived, prior to the hand over, while the mobile station is connected to the source base station. Thus, the mobile station may perform the hand over without the need to perform full authentication.

The mechanism of deriving AK automatically from a parent key, e.g., a pairwise master key (PMK), may generate a context per derived key. The context may be derived only once per base station and PMK, and may be used until the PMK expires. Thus, the mobile station and/or the base station may need to cache the AKs and context being used to later be re-used when the mobile station is handed over to a previously used base station.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
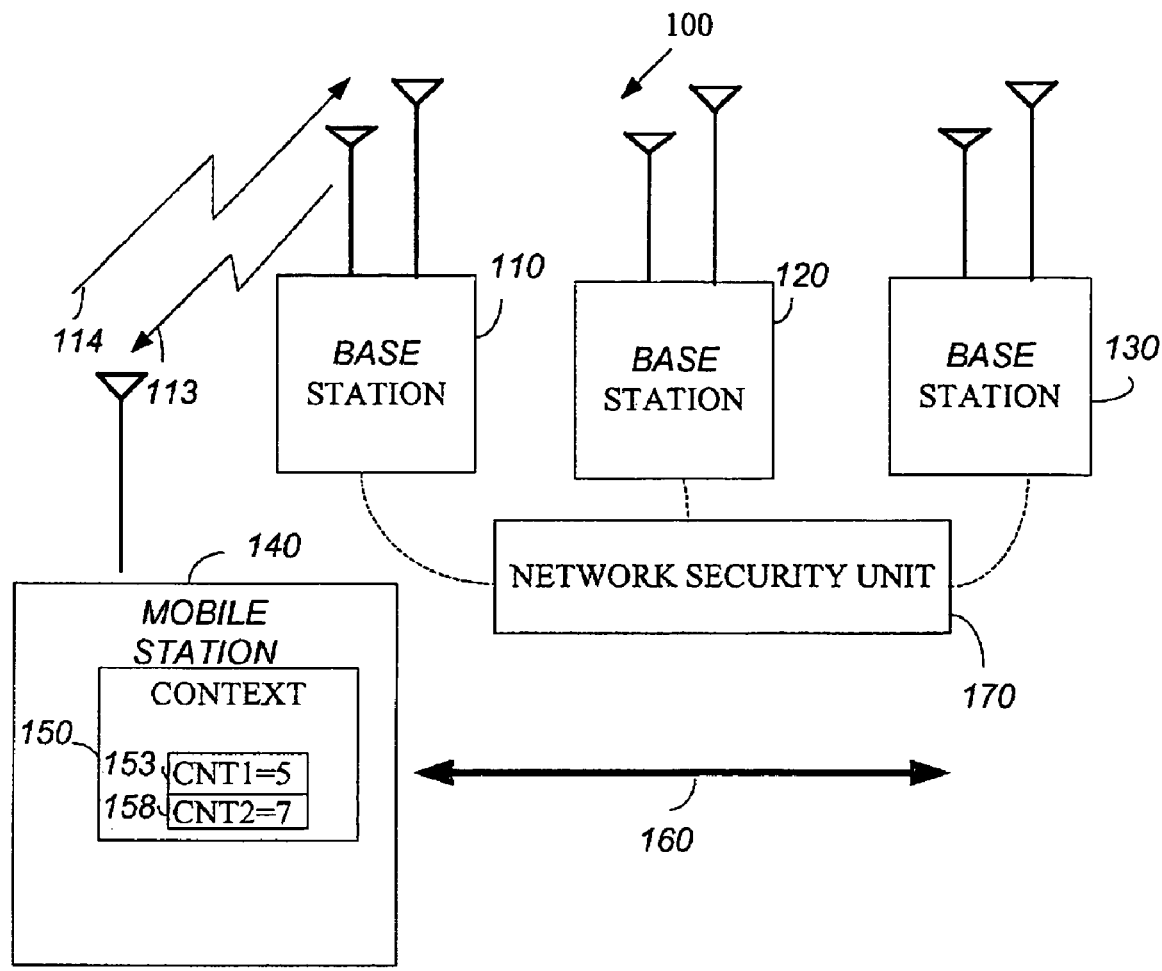
FIG. 1 is a schematic block diagram of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the circuits and techniques disclosed herein may be used in many apparatuses such as, for examples modems, wireless local area network (WLAN) stations, WMAN stations or the like. Portable communication devices intended to be included within the scope of the present invention may include, by a way of example only, cellular radiotelephone portable communication devices, digital communication system portable devices, and the like.

Types of cellular radiotelephone systems intended to be within the scope of the present invention include, although are not limited to, Global System for Mobile communication (GSM) cellular radiotelephone, General Packet Radio Service (GPRS), Extended GPRS (EGPRS), and the like.

For simplicity, although the scope of the invention is in no way limited in this respect, embodiments of the present invention that will be described below may be related to WMAN network. The term "plurality" may be used throughout the specification to describe two or more components, devices, elements, parameters and the like. For example, "plurality of mobile stations" describes two or more mobile stations. The terms roam, roaming and a hand over may be refer to the operation of disconnecting of a mobile station from a first base station and connecting to another base station. Although for simplicity, the term hand over will be used with the embodiments of the present invention to describe the above mentioned operation. In addition, it should be known to one skilled in the art that the term "a wireless communication station" may refer to, but is not limited to, a base station, an access point or the like.

Some embodiments of the invention may be implemented, for example, using a machine-readable medium or article which may store an instruction or a set of instructions that, if executed by a machine (for example, by a wireless station, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, high level design programming language, assembly language, machine code, or the like.

Referring firstly to FIG. 1, a block diagram of a wireless communication system 100 according to some embodiments of the present invention is shown. Wireless communication system 100, for example WMAN, may include base stations 110, 120 and 130 and a mobile station 140. In some other embodiments of the present invention, wireless communication system 100 may include a network security unit 170 to derive authentication keys to base stations 110, 120 and 130, if desired. For example, network security unit 170 may include a PMK and may derive a first AK for base station 110, a second AK for base station 120 and a third AK for base station 130, using an irreversible function that may receive as input the PMK and the base station ID (BSID), if desired. This function may be referred as Key Derivation Function (KDF) and may be depicted as follows: AK=KDF(PMK,BSID).

According to this exemplary embodiment, mobile station 140 may transmit and/or receive communications with at least one of base station 110, 120 and 130. For example, mobile station 140 may transmit communications over an uplink channel 114 to base station 110 and may receive communications over downlink channel 113. The communications between base station 110 and mobile station 140 may be ciphered and/or authenticated according to an authentication key, if desired. The authentication key may be derived from the PMK. For example, base stations 110, 120 and 130 and/or network security server 170 may derive the authentication key from a common PMK, although the scope of the present invention is not limited in this respect.

According to exemplary embodiments of the present invention, arrow 160 may indicate movement directions of mobile station 140. Mobile station 140 may include a context 150 and may be handed over from one base station to another base station. For example, context 150 may include a downlink counter 153 (e.g, CNT1) to count, for example, transmissions of authenticated communications over downlink channel 113, and an uplink counter 158 (e.g., CNT2) to count, for example, transmissions of authenticated messages over uplink channel 114, if desired.

According to an exemplary embodiment of the invention, the hand over from a source base station (e.g., base station 110) to a target base station (e.g., base station 120) may include transferring context 150 to the target base station. The target base station (e.g., base station 110) may use context 150 with its authentication key. Counters 153 and 158 may continue to count from the last count prior to the hand over.

Although the scope of the present invention is not limited in this respect, it should be understood that context 150 may be transferred while mobile station 140 performs a hand over from one base station to another base station. According to exemplary embodiments of the invention, counters 153 and 158 may continue to count from the last count prior to the hand over.

Figure 2:
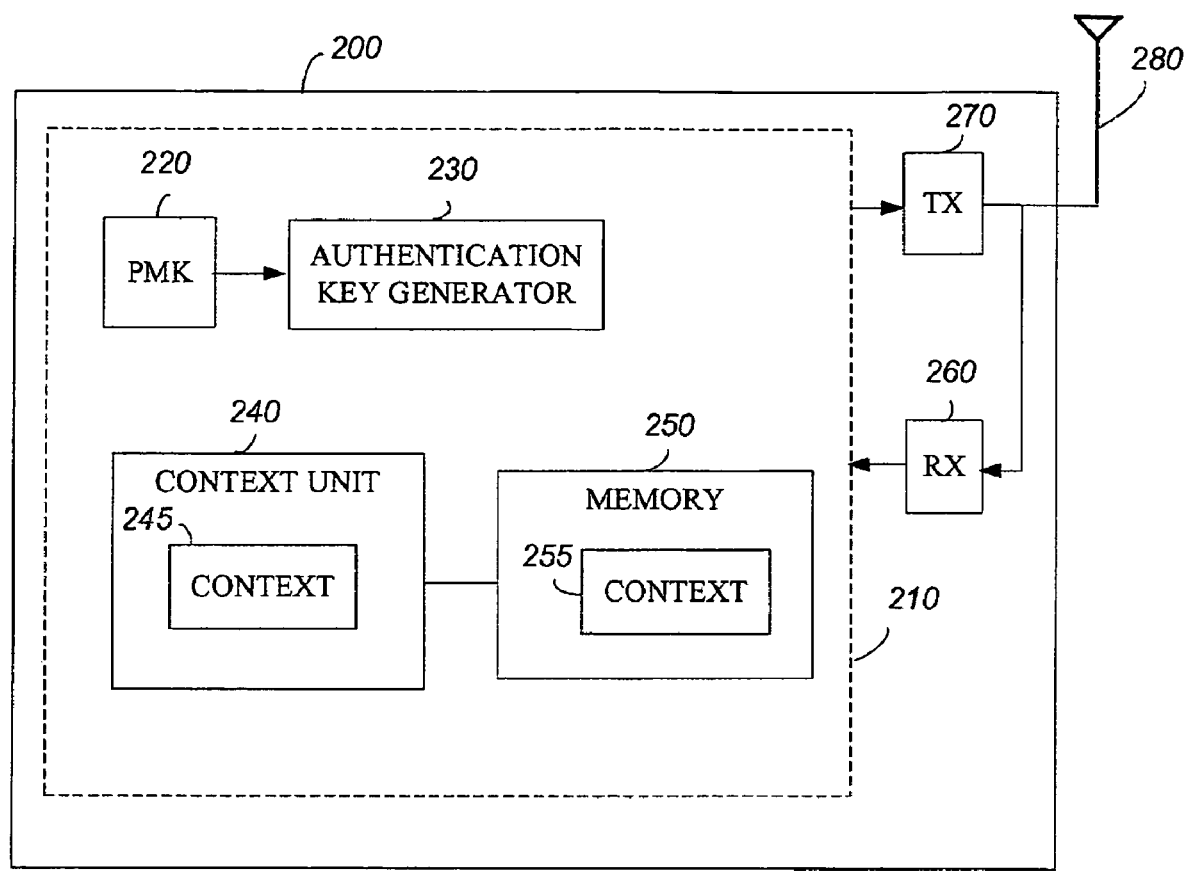
FIG. 2 is a block diagram of a base station according to an exemplary embodiment of the present invention.

Turning to FIG. 2, a block diagram of a base station 200 according to exemplary embodiments of the invention is shown. Although the scope of the present invention is not limited in this respect, base station 200 may include an authentication unit 210, a transmitter (TX) 270, a receiver (RX) 260, and an antenna 280. Authentication unit 210 may include a pairwise muster key (PMK) 220, an authentication key generator 230, a context unit 240 and a memory 250.

According to some exemplary embodiments of the present invention, antenna 280 may transmit and/or receive authenticated communications from/to a mobile station which may be for example, a subscriber station. According to some embodiments of the invention, base station 200 may include at least one antenna. For example, antenna 280 may include a dipole antenna, a dual polar panel antenna, an omni directional antenna, a Yagi antenna or the like.

According to an exemplary embodiment of the invention, authentication key generator 230 may generate an authentication key from PMK 220. The authentication key together with a context (e.g., context 245) may be used to authenticate communications over an air link with the mobile station (e.g., mobile station 140). Context unit 240 may receive from the mobile station and/or from another base station (e.g., base station 120), context 245, if desired. Context 245 may include a communications counter. The communication counter may indicate a prior number of authenticated communications that the mobile station exchanged over the downlink and/or the uplink with one or more base stations. Context unit 240 may be able to resume the counting of the authenticated communications between the base station and the mobile station, if desired.

According to some exemplary embodiment of the invention, base station 200 may include one context (e.g. context 245) for communicating with the mobile station and a second context (e.g., context 255) which may be stored in memory 250. For example, base station 200 may send context 255 to neighboring base stations (e.g., base stations 120 and 130) when the mobile station performs a hand over to one of the neighboring base station. Context 255 may be used to authenticate the communications between the mobile station and the neighboring base station and context 245 may be stored in memory.

Accordingly, when the mobile station performs a hand over from one base station to another base station having their authentication keys derived from a common PMK, one context may be used for authenticating the communications and the other context may be stored, although the scope of the present invention is not limited in this respect. Furthermore, it should be understood that in other embodiments of the invention, authentication unit 210 may be implemented in an network security unit (e.g., network security unit 170). It should be also understood that authentication unit 210 may be implemented by hardware, and/or by software, and/or by any combination of hardware and software.

Figure 3:
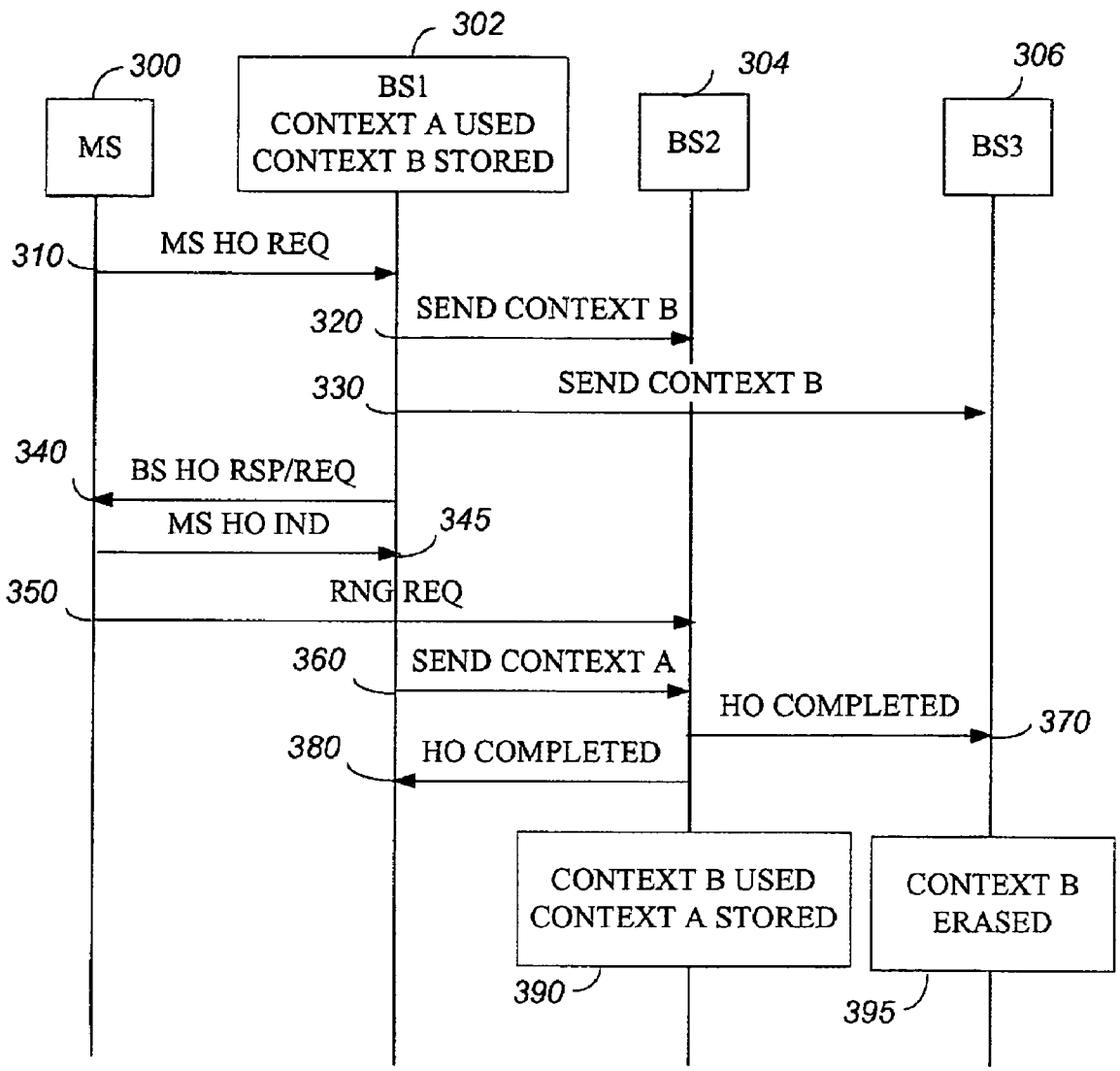
FIG. 3 is an illustration of a flow diagram to demonstrate a method of performing a hand over from one base station to another base station according to exemplary embodiments of the invention.

Turning to FIG. 3, an illustration of a flow diagram to demonstrate a method of performing a hand over from one base station to another base station according to exemplary embodiments of the invention is shown. Although the scope of the present invention is not limited in this respect, hand over from a first base station (BS) 302 to a second base station (BS2) 304 may start by a mobile station (MS) 300. MS 300 may send a hand over request (MB HO REQ) 310 to BS1 302. In this exemplary embodiment, BS1 302 may use context A to authenticate communications with MS 300. BS1 may send a copy of a stored context B to BS2 304 (message 320) and to BS3 306 (message 330).

According to this exemplary embodiments, BS1 302 may respond to the hand over request (message 340, BS HO RSP/REQ). MS 300 may send HO indication to signal a target BS (e.g., BS2 302) that a hand over may be preformed (message 345, MS HO IND). Mobile station 300 may send a ranging request (message 350, RNG REQ) to BS2 302 as the first message with the target BS after performing the hand over. The ranging message may be authenticated using BS2 AK and context B, if desired.

According to this exemplary embodiment of the invention, BS1 may send context A to BS2 304 (message 360). BS1 may erase context A and context B, if desired. When the hand over is completed, BS2 may send messages indicating that the hand over is completed (massages 370, 380) to BS1 302 and BS3 306. At this point, or after expiration of a predetermined time period, BS3 may erase context B (text block 395). BS2

304 may use context B to authenticate communications with MS 300 and may store context A (text block 390).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A device comprising:
an authentication unit to authenticate communications between a wireless communication station and a mobile station, the authentication unit including:
an authentication key generator capable of generating from a pairwise master key an authentication key;
a context unit to update a first context based on a count of authenticated communications exchanged, between the wireless communication station and the mobile station using the authentication key; and
a memory to store a second context including a count of previous authenticated communications, which were exchanged with the mobile station based on the pairwise master key,
wherein the authentication unit is to provide the second context to another wireless communication station, in response to a request for a handoff process to handoff communication with the mobile station from the wireless communication station, and wherein, during the handoff process the authentication unit is to authenticate communications with the mobile station using the first context and the authentication key;
wherein the first context includes an uplink counter and a downlink counter, and wherein the context unit is to update the uplink counter based on a count of authenticated communications exchanged over an uplink between the mobile station and the wireless communication station, and to update the downlink counter based on a count of authenticated communications exchanged over a downlink between the wireless communication station and the mobile station; and
wherein the context unit is to update the first context by resuming the count of the first context.

2. The device of claim 1, wherein the authentication unit is to receive the first and second contexts in association with a handover process for handing over the communication with the mobile station to the wireless communication station.

3. The device of claim 2 wherein the first context, when received by the wireless communication station, includes another count of previous authenticated communications based on the pairwise master key, which were exchanged with the mobile station prior to handing over the communication with the mobile station to the wireless communication station.

4. The device of claim 3 wherein the context unit is to update the first context by resuming the count of the received first context.

5. The device of claim 1 wherein the authentication unit is to provide the first context to the other wireless communication station after providing the second context.

6. The device of claim 5 wherein the authentication unit is to provide the first context to the other wireless communication station after receiving a range request from the other wireless communication station.

7. A wireless communication station comprising:
an antenna to transmit signals to a mobile station;
an authentication unit to authenticate communications between the wireless communication station and the mobile station, the authentication unit including:
an authentication key generator capable of generating from a pairwise master key an authentication key;
a context unit to update a first context based on a count of authenticated communications exchanged between the wireless communication station and the mobile station using the authentication key; and
a memory to store a second context including a count of previous authenticated communications, which were exchanged with the mobile station, based on the pairwise master key,
wherein the wireless communication station is to transmit the second context to another wireless communication station, in response to a request for a handoff process to handoff communication with the mobile station from the wireless communication station;
wherein, during the handoff process the authentication unit is to authenticate communications with the mobile station using the first context and the authentication key;
wherein the first context includes an uplink counter and a downlink counter, and wherein the context unit is to update the uplink counter based on a count of authenticated communications exchanged over an uplink between the mobile station and the wireless communication station, and to update the downlink counter based on a count of authenticated communications exchanged over a downlink between the wireless communication station and the mobile station; and
wherein the context unit is to update the first context by resuming the count of the first context.

8. The wireless communication station of claim 7, wherein the wireless communication station is to receive the first and second contexts in association with a handover process for handing over the communication with the mobile station to the wireless communication station.

9. The wireless communication station of claim 8, wherein the first context, when received by the wireless communication station, includes another count of previous authenticated communications based on the pairwise master key, which were exchanged with the mobile station prior to handing over the communication with the mobile station to the wireless communication station.

10. The wireless communication station of claim 9, wherein the context unit is to update the first context by resuming the count of the received first context.

11. The wireless communication station of claim 7, wherein the wireless communication station is to transmit the first context to the other wireless communication station after transmitting the second context.

12. The wireless communication station of claim 11, wherein the wireless communication station is to transmit the first context to the other wireless communication station after receiving a range request from the other wireless communication station.

13. A method comprising:
generating from a pairwise master key an authentication key;
updating a first context based on a count of authenticated communications exchanged between a wireless communication station and a mobile station using the authentication key;
storing a second context including a count of previous authenticated communications, which were exchanged with the mobile station, based on the pairwise master key;

transmitting the second context to another wireless communication station, in response to a request for a handoff process to handoff communication with the mobile station from the wireless communication station; and during the handoff process, authenticating communications between the wireless communication station and the mobile station using the first context and the authentication key;

wherein the first context includes an uplink counter and a downlink counter, and wherein updating the first context includes updating the uplink counter based on a count of authenticated communications exchanged over an uplink between the mobile station and the wireless communication station, and updating the downlink counter based on a count of authenticated communications exchanged over a downlink between the wireless communication station and the mobile station; and wherein updating the first context includes updating the first context by resuming the count of the first context.

14. The method of claim 13 comprising receiving the first and second contexts in association with a handover process for handing over the communication with the mobile station to the wireless communication station.

15. The method of claim 14, wherein the first context, when received, includes another count of previous authenticated communications based on the pairwise master key, which were exchanged with the mobile station prior to handing over the communication with the mobile station to the wireless communication station.

16. The method of claim 15, wherein updating the first context includes resuming the count of the received first context.

17. The method of claim 13 including transmitting the first context to the other wireless communication station after transmitting the second context.

18. The wireless communication station of claim 17, wherein comprising transmitting the first context to the other wireless communication station after receiving a range request from the other wireless communication station.

* * * * *

UNITED STATES PATENT AND TRADEMARK OFFICE
CERTIFICATE OF CORRECTION

PATENT NO. : 7,706,800 B2  
APPLICATION NO. : 11/318568  
DATED : April 27, 2010  
INVENTOR(S) : Avishay Sharaga It is certified that error appears in the above-identified patent and that said Letters Patent is hereby corrected as shown below:

In column 5, line 18, in claim 1, delete "exchanged," and insert -- exchanged --, therefor.

In column 5, line 48, in claim 3, delete "claim 2" and insert -- claim 2, --, therefor.

In column 5, line 56, in claim 4, delete "claim 3" and insert -- claim 3, --, therefor.

In column 5, line 59, in claim 5, delete "claim 1" and insert -- claim 1, --, therefor.

In column 5, line 62, in claim 6, delete "claim 5" and insert -- claim 5, --, therefor.

In column 6, line 18, in claim 7, delete "station;" and insert -- station, --, therefor.

In column 6, line 21, in claim 7, delete "key;" and insert -- key, --, therefor.

In column 8, line 16-17, in claim 18, delete "claim 17, wherein" and insert -- claim 17 --, therefor.

Signed and Sealed this

Third Day of August, 2010

David J. Kappos  
*Director of the United States Patent and Trademark Office*